United States Patent [19]
Clopton

[11] Patent Number: 6,059,097
[45] Date of Patent: May 9, 2000

[54] SMOOTH-DRIVING CONVEYOR CHAIN WITH NON-CYLINDRICAL PIN

[75] Inventor: Robert T. Clopton, Magnolia, Ky.

[73] Assignee: Tekno, Inc., Cave City, Ky.

[21] Appl. No.: 08/949,057

[22] Filed: Oct. 10, 1997

[51] Int. Cl.[7] .................................................. B65G 17/06
[52] U.S. Cl. ........................................................ 198/852
[58] Field of Search ............................................ 198/852

[56]     References Cited

U.S. PATENT DOCUMENTS 3,392,819   7/1968   Waite ..................................... 198/852
4,782,940  11/1988   Hogg ...................................... 198/852
5,489,020   2/1996   Clopton .

Primary Examiner—Christopher P. Ellis
Assistant Examiner—Joe Dillon, Jr.
Attorney, Agent, or Firm—Camoriano & Associates; Theresa Fritz Camoriano

[57]     ABSTRACT

A conveyor chain is made up of carrier links and connector links connected together by non-cylindrical pins. The non-cylindrical pins abut corresponding non-arcuate surfaces of the connector links, which prevents rotation of the pins relative to the connector links. Also, the non-cylindrical pins fit into non-cylindrical holes defined by the carrier links, which limit rotation of the pins relative to the carrier links.

15 Claims, 8 Drawing Sheets

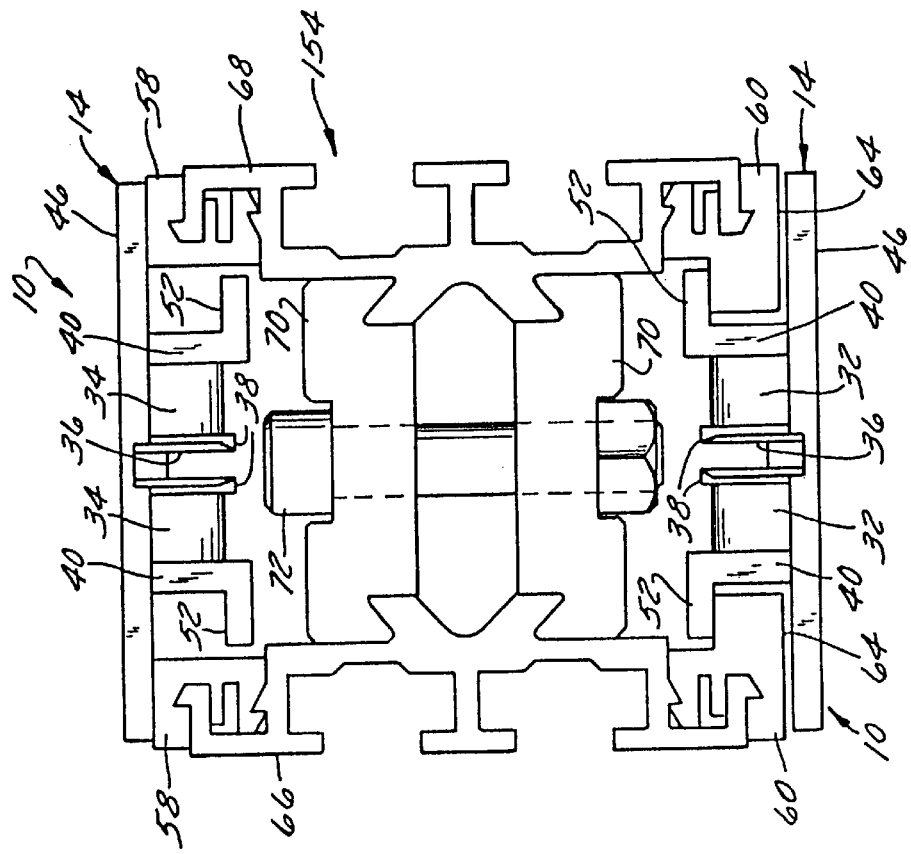
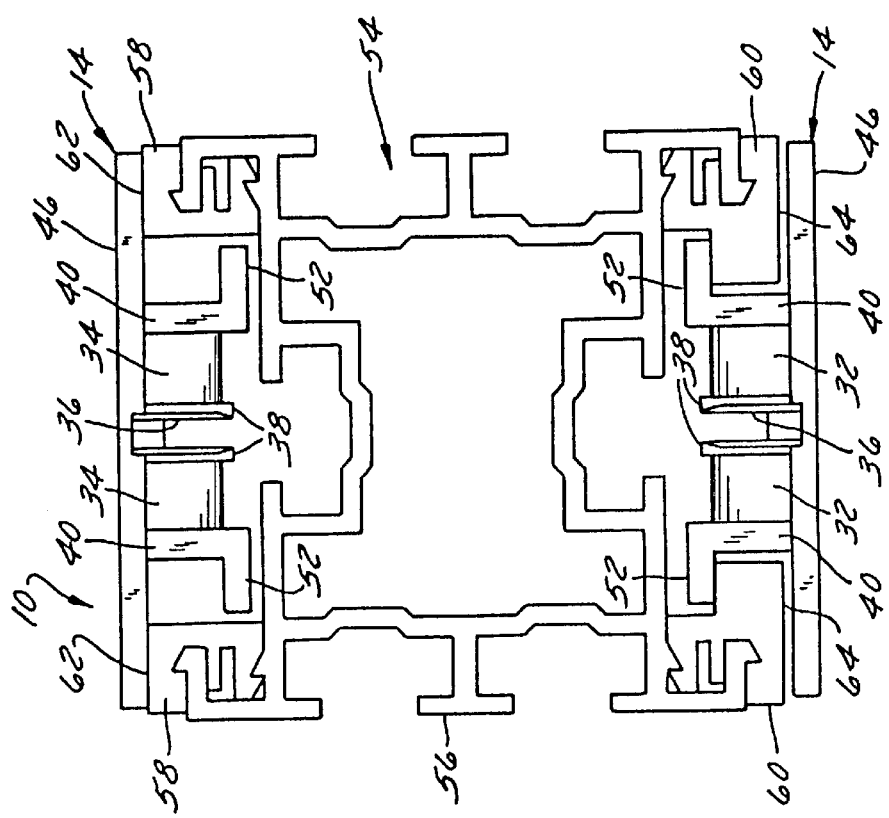
FIG. 7B
FIG. 7A

SMOOTH-DRIVING CONVEYOR CHAIN WITH NON-CYLINDRICAL PIN

BACKGROUND OF THE INVENTION

The present invention relates to conveyor chains. Many different types of conveyor chains are known in the art. These chains generally have a flat top surface for carrying products, and each link of the chain provides a surface against which a sprocket tooth can push for driving the chain.

U.S. Pat. No. 5,489,020 "Clopton", which is hereby incorporated herein by reference, describes a conveyor chain which has many advantages, including reducing the cordal effect and providing good tensile strength. However, this chain has a wear problem. The steel pins that secure the connector links to the carrier links rotate freely in holes defined by the connector links. Since the pins and the connector links are both made of metal, the rotation of the pins relative to the connector links causes wear between the two metal parts, which can eventually lead to failure of the chain.

SUMMARY OF THE INVENTION

The present invention provides a conveyor chain which has all the advantages of the earlier Clopton chain design and overcomes the wear problem described above. The problem is overcome by providing a design which prevents the pins from rotating freely relative to the connector links. The present invention includes non-cylindrical connector pins, which preferably include a curved lateral surface and a substantially flat lateral surface, and which contact non-arcuate internal surfaces defined by the connector links. These non-arcuate surfaces limit the rotation of the pins relative to the connector links, substantially reducing relative movement between the metal connector links and the metal pins, which reduces wear.

In the preferred embodiment, the holes in the carrier links are also non-cylindrical, thereby limiting the movement of the pins relative to the carrier links.

BRIEF DESCRIPTION OF THE DRAWINGS

FIG. 7A is an end view of the conveyor frame of FIG. 1, with the drive removed for clarity;

FIG. 7B is the same view as FIG. 7A, but showing a second embodiment of the frame;

DESCRIPTION OF THE PREFERRED EMBODIMENTS

Figure 1:
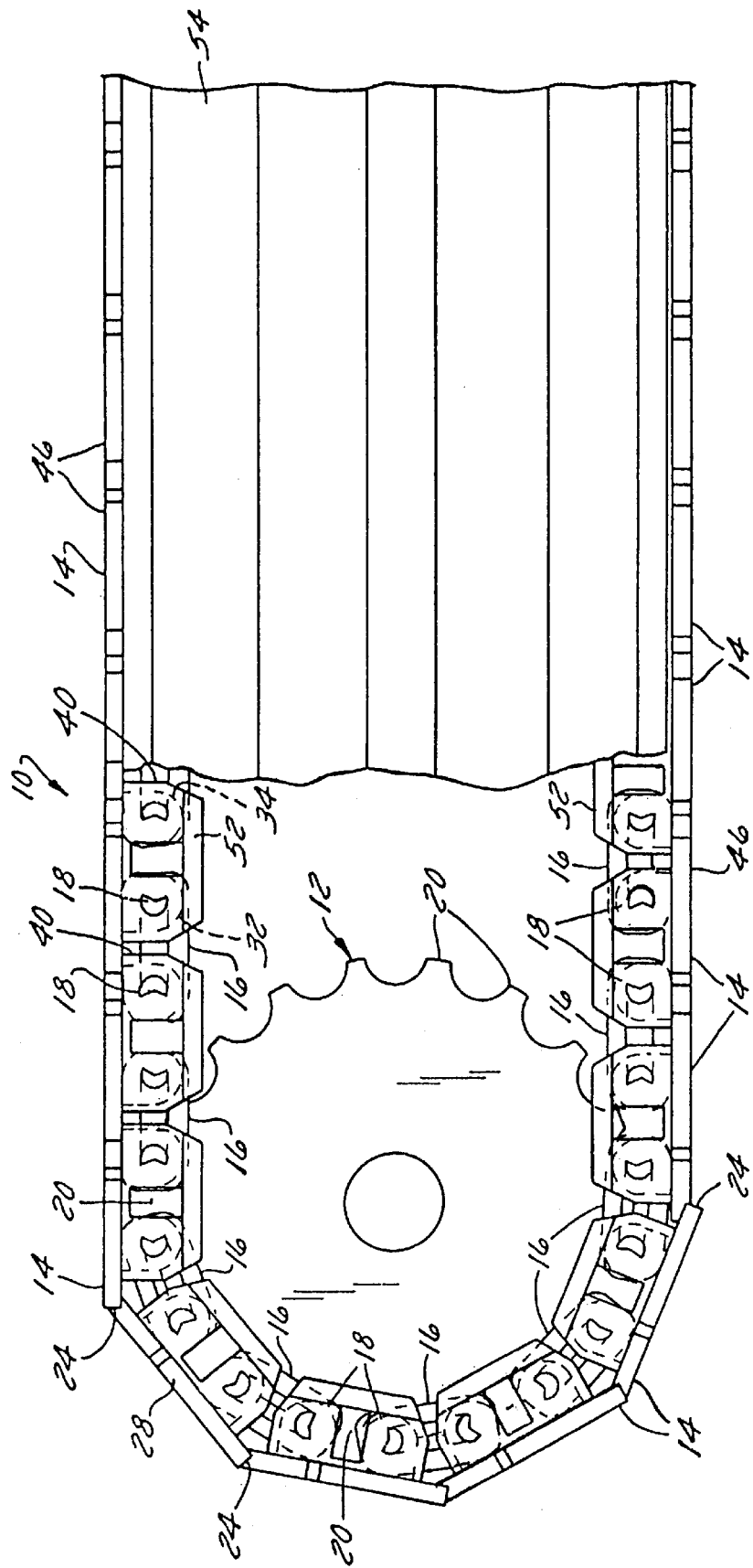
FIG. 1 is a side view of a conveyor using the chain of the present invention, with part of the conveyor frame broken away to show the chain and drive sprocket.

FIGS. 1–6 and 10–11 show a first embodiment of the chain of the present invention. FIG. 1 shows a side view of the chain 10 being driven from below by a sprocket 12. The chain 10 is made up of carrier links 14 and connector links 16, which are connected together by pins 18. It should be noted that there are forward and rear drive points on each carrier link 14, so that, as the sprocket 12 rotates, it first contacts the forward drive points and then the rear drive points on the carrier link 14. This provides a much smoother drive than in typical chains, in which the sprocket contacts each link at only one radial position.

Looking now at FIGS. 3–6 and 10, each carrier link 14 has a link body 22, which defines a forward edge 24, a rear edge 26, a left side 28, and a right side 30. The carrier link 14 also has an aligned pair of forward knuckles 32 and an aligned pair of rear knuckles 34. There is a space 36 between each pair of knuckles, and that space 36 receives the respective connector link 16. Each connector link 16 receives two pins 18. The forward pin 18 of each connector link 16 passes through the rear knuckles 34 of one carrier link 14, and the rear pin 18 passes through the forward knuckles 32 of the next carrier link 14.

Each knuckle 32, 34 is supported by inner and outer plates 38, 40, which are integral with the link body 22 and which, therefore, distribute the forces from the knuckles 32, 34 into the link body 22, which provides good tensile strength and reduces stretching of the chain. Each pair of knuckles 32, 34 defines a hole 33 for receiving the pin 18.

Figure 2:
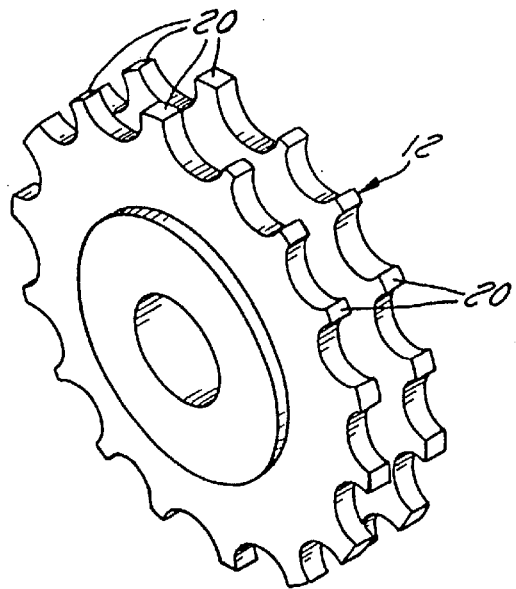
FIG. 2 is a perspective view of the sprocket of FIG. 1.

The sprocket 12, shown in FIG. 2, is a double sprocket, with aligned left and right teeth 20. For driving the chain, if the first pair of sprocket teeth 20 drives against the left and right forward knuckles 32 of one carrier link 14, then the next pair of sprocket teeth 20 drives against the left and right rear knuckles 34 of the same carrier link 14. The next pair of teeth 20 drives against the forward knuckles 32 of the next carrier link 14, and so forth, so that each carrier link is contacted by two different pairs of teeth 20 in two different radial positions as the sprocket 12 rotates.

Figure 11:
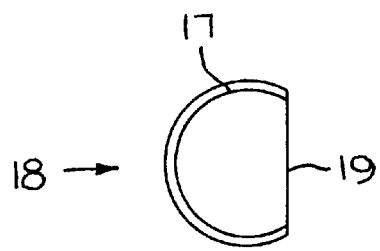
FIG. 11 is an enlarged end view of the D-shaped pin of FIGS. 3 and 9.

To overcome the wear problems of the prior art described above, the forward and rear pins 18 of the present invention are non-cylindrical. Referring to FIG. 11, it can be seen that the pins 18 preferably have a generally D-shaped cross-section. In this preferred embodiment, the cross-section of the pin 18 comprises an area defined by an arc 17 of approximately 240 degrees and a straight line 19 connecting the end points of that arc. The pins thus have a curved lateral surface 17 and a substantially flat lateral surface 19. While the D-shaped pin described herein is preferred, it will be understood that other non-cylindrical shapes of pins could also improve over the prior art.

Figure 3:
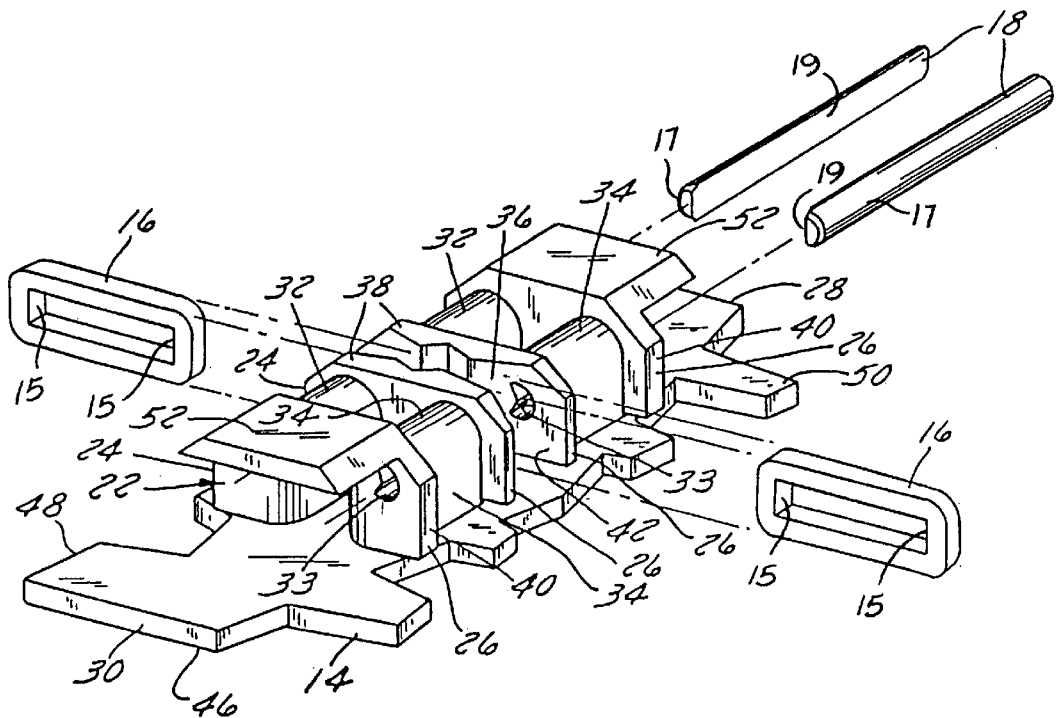
FIG. 3 is an exploded bottom perspective view of a portion of the chain of FIG. 1.
Figure 6:
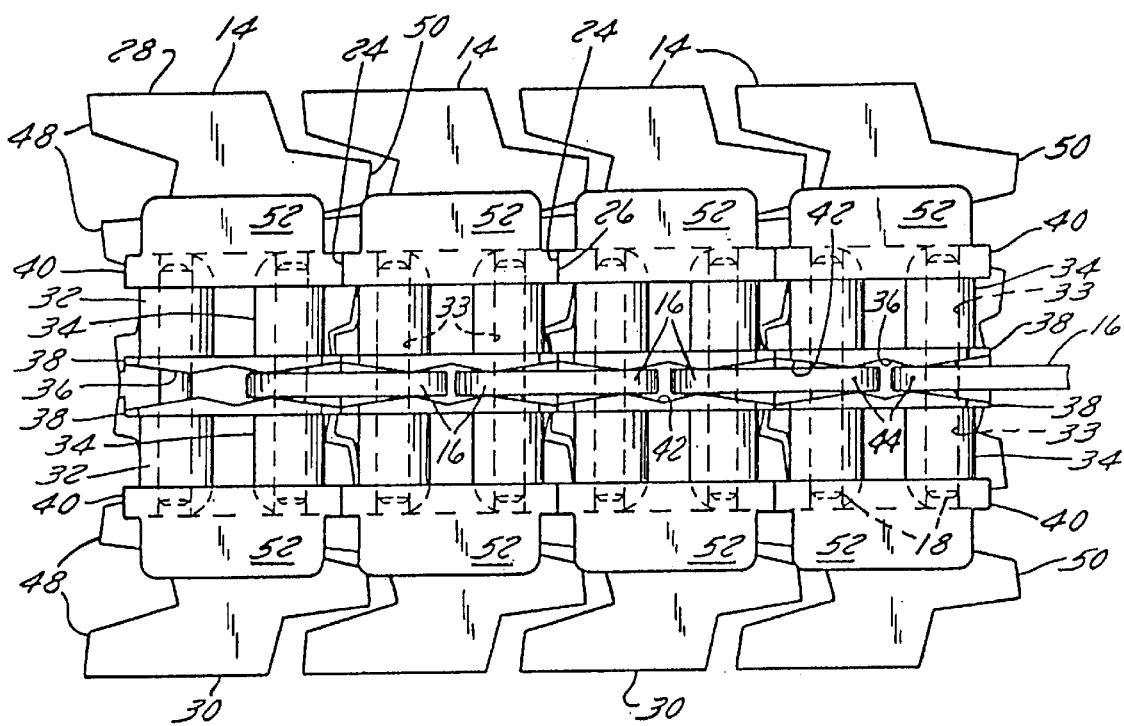
FIG. 6 is the same view as FIG. 4, but with the chain collapsed on itself, as might occur if the chain stretched.
Figure 4:
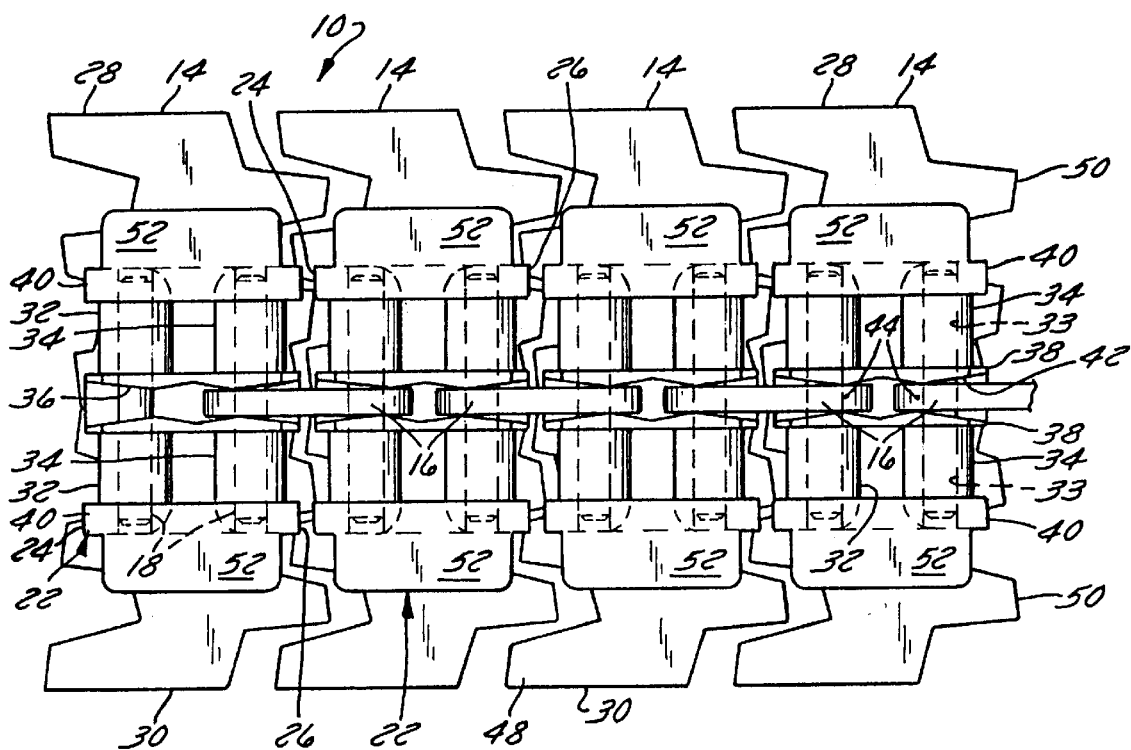
FIG. 4 is a bottom view of the chain of FIG. 1.
Figure 5:
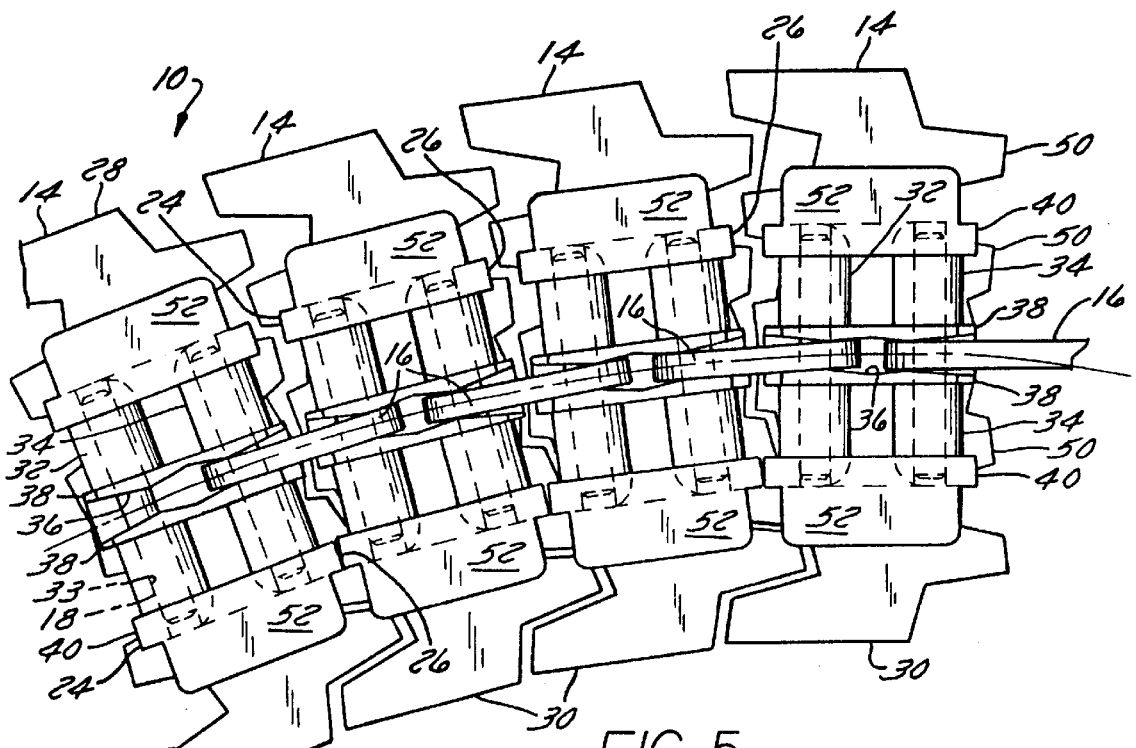
FIG. 5 is the same view as FIG. 4, but showing the chain flexing to the side.
Figure 10:
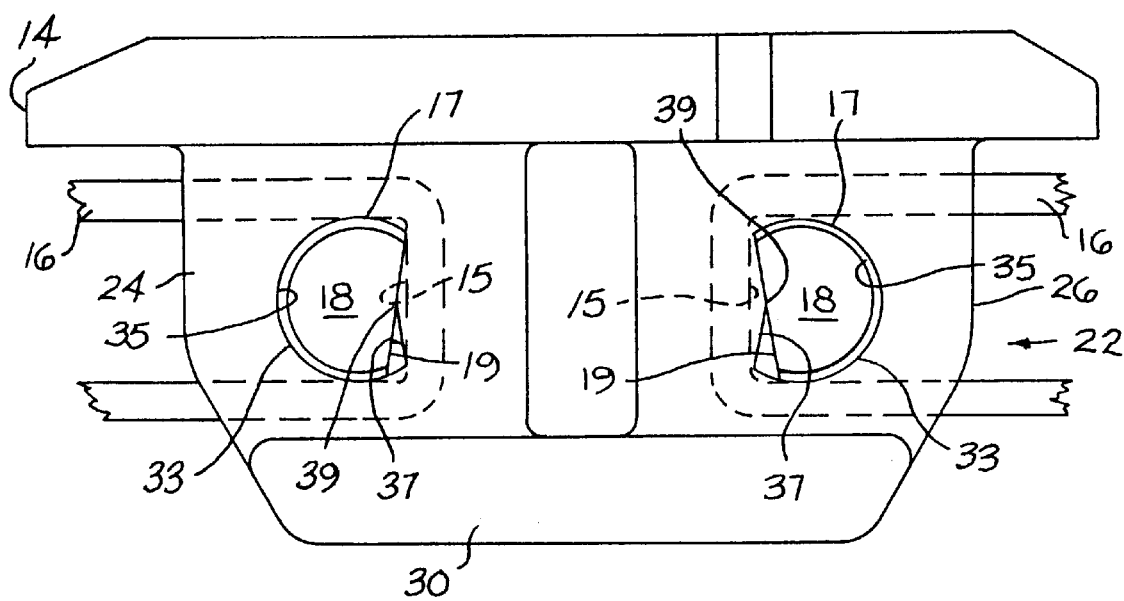
FIG. 10 is an enlarged side view of the links of FIGS. 3 and 9.

The holes 33 defined by each pair of knuckles 32, 34 also are not cylindrical. Rather, as best shown in FIG. 10, the holes 33 are shaped to receive the D-shaped pins 18 while allowing for a limited rotation between the pin 18 and the carrier link of +/−10 degrees. Each hole 33 has an arcuate portion 35 of approximately 250 degrees and a wide, V-shaped portion 37, defining a pivot point 39. The arcuate outer surface 17 of the pin 18 contacts the arcuate inner surface 35 of the hole 33, and half of the pin's flat surface 19 contacts half of the hole's V-shaped surface 37. The pin 18 may rotate, or rock, about the pivot point 39 of the hole 33, located at the midpoint of the pin's flat surface 19. The holes 33 are oriented such that the flat surfaces 19 of the two pins 18 on a carrier link 14 face inwardly toward one another. As shown in FIG. 3, the connector links 16 have corresponding forward and rear flat inner surfaces 15, against which the flat surfaces 19 of the respective pins 18 abut when the chain 10 is assembled. With the flat wall 19 of the pin 18 pressing against the flat inner surface 15 of the connector link 16, the pin 18 cannot rotate relative to the connector link 16. In the preferred embodiment, the carrier links 14 are made of plastic, and the connector links 16 are made of metal. Since the metal pins 18 cannot rotate relative to the metal connector links 16, metal-to-metal wear is significantly reduced.

Stretching of the chain 10 is also reduced due to the chain design. The connector links 16 are made of metal, which does not stretch easily, and the pins 18 are embedded in knuckles 32, 34, which are supported by the inner and outer plates 38, 40, thereby reducing the opportunity for stretching of the plastic carrier links 14.

The inner surfaces 42 of the inner plates 38 are contoured to define a pivot point 44 about which the links pivot for side-flexing of the chain 10. The pivot point 44 is at the contact point between the metal pin 18 and the metal connector link 16. The pivoting action is much less likely to cause wear than does the sliding action of many prior art side-flexing chains. Also, there is no sliding against the carrier link 14 during side flexing, so the plastic carrier link 14 should not wear due to side flexing of the chain.

In the event that the chain 10 does stretch slightly during operation, the design shown in this embodiment permits the links to collapse slightly, to take up any slack in the chain 10. In normal operation, when the chain 10 is in tension, the links take the position shown in FIG. 4, with a gap between the front and rear edges 24, 26 of respective plates 38, 40 of adjacent links 14, which provides room for side flexing. If the links collapse on each other, they will take the position shown in FIG. 6, with the front and rear edges 24, 26 of the respective inner and outer plates 38, 40 abutting each other. Since the ends 24, 26 of the plates 38, 40 are square and are aligned, when they abut each other, they make the chain rigid and able to be pushed, without becoming skewed and jamming.

The top 46 of the carrier link 14 is flat for carrying articles. The top 46 shown in this embodiment is integral with the link body 22, but it would also be possible for the top to be a separate piece which is attached to the link body 22 or for another attachment to be added to the integral top 46. In this embodiment, the top 46 has forward teeth 48 and rear teeth 50. The forward teeth 48 of one carrier link 16 mesh with the rear teeth 50 of the next carrier link 16. The forward and rear teeth 48, 50 mesh with a loose enough fit to permit side flexing of the chain 10.

Figure 7C:
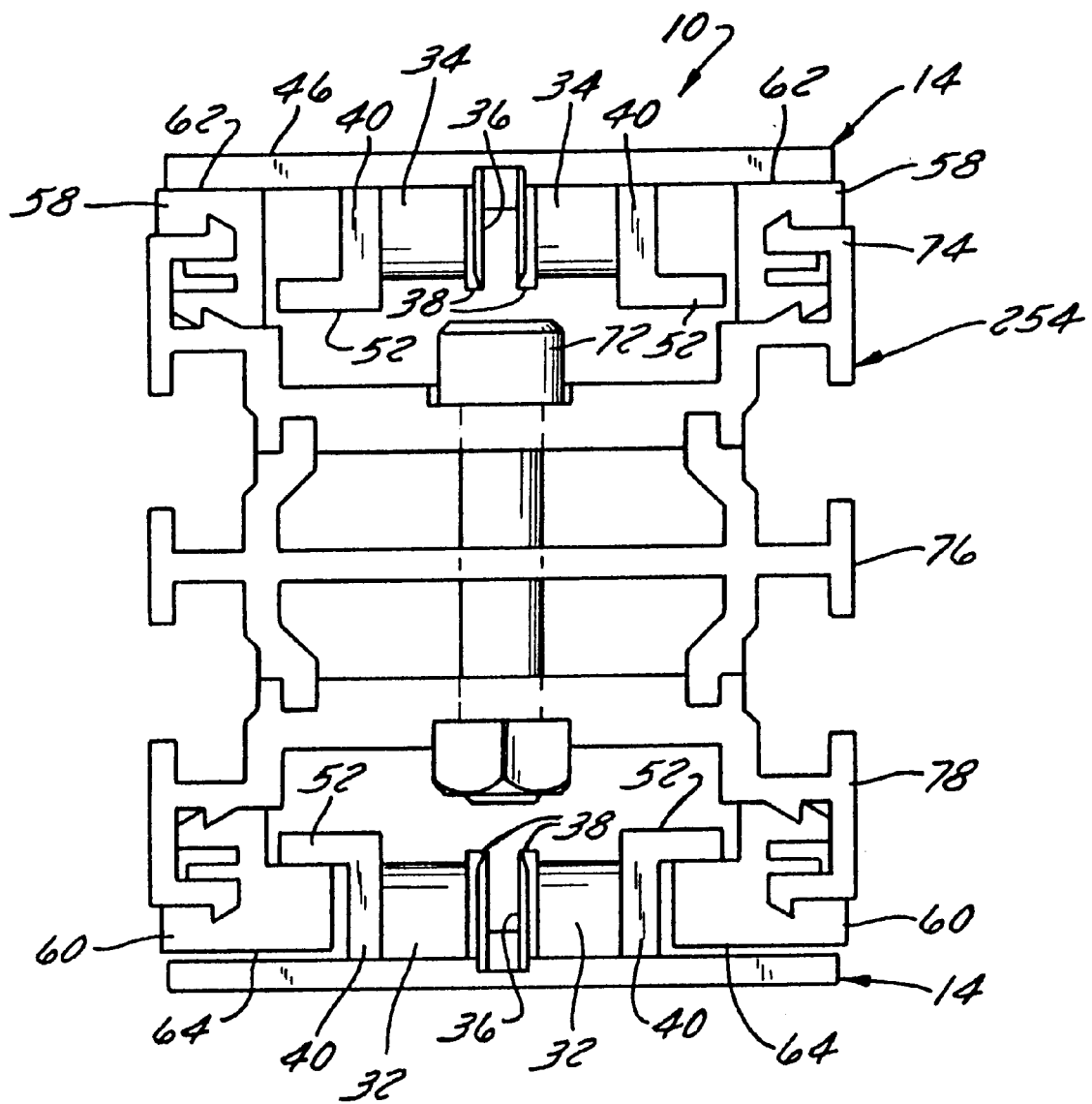
FIG. 7C is the same view as FIG. 7A, but showing a third embodiment of the frame.

The outer plates 40 of the carrier links 14 include horizontally-projecting wings 52, which are used to retain the chain 10 on the frame. FIGS. 7A, 7B, and 7C show three types of frames which can be used to support the chain 10. The frame 54 of FIG. 7A is a single piece 56, which is preferably an aluminum extrusion, with two upper attachments 58 and two lower attachments 60. The attachments 58, 60 are made of a flexible, low-friction material. The upper attachments 58 snap over the top of the frame 54 and provide a flat upper surface 62 on which the upper run of the chain 10 is supported. The low friction material permits the chain to slide easily along the flat upper surfaces 62. The lower attachments 60 snap onto the lower portion of the single piece 56 and provide projections 64 which support the wings 52 of the chain 10 on the lower run.

The frame 154 shown in FIG. 7B functions the same way as that shown in FIG. 7A, but it is made up of left and right extrusions 66, 68, which are fastened together by brackets 70 and bolts 72.

The frame 254 shown in FIG. 7C functions the same way as the frame shown in FIG. 7A, but it is made up of three extruded members 74, 76, 78, which are bolted together.

The advantage of these frames 54, 154, 254 over the prior art is that they permit the chain 10 to be lifted straight up in the upper run, while still retaining the chain 10 in the lower run. It is advantageous to be able to lift the chain 10 straight up out of the frame in order to clean below it, in the event that debris gets into the frame.

Figure 8:
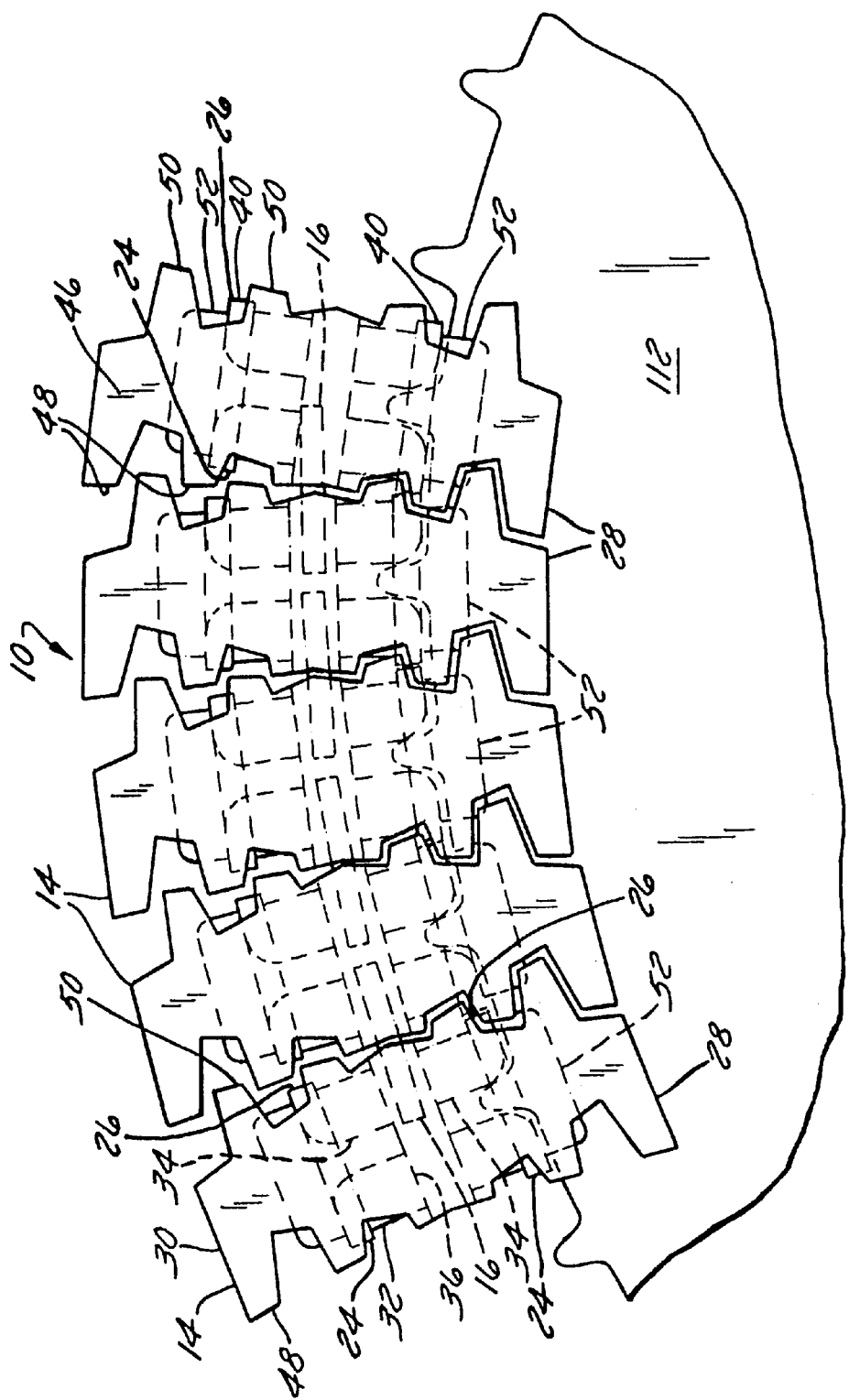
FIG. 8 is a top view of the chain of FIG. 1 being driven from the side.

FIG. 8 shows the chain 10 of FIGS. 1–6 being driven by a sprocket 112 from the side. The forward knuckles 32 and the rear knuckles 34 of the carrier links 14 are contoured at their left and right ends to form a tooth-receiving surface, so that this chain 10 can also be driven from either side. When this chain 10 is driven from the side, there is only one drive contact point per carrier link 14, but, due to the fact that side drive sprockets are usually larger, there is not a problem of cordal pitch when driving from the side.

Figure 9:
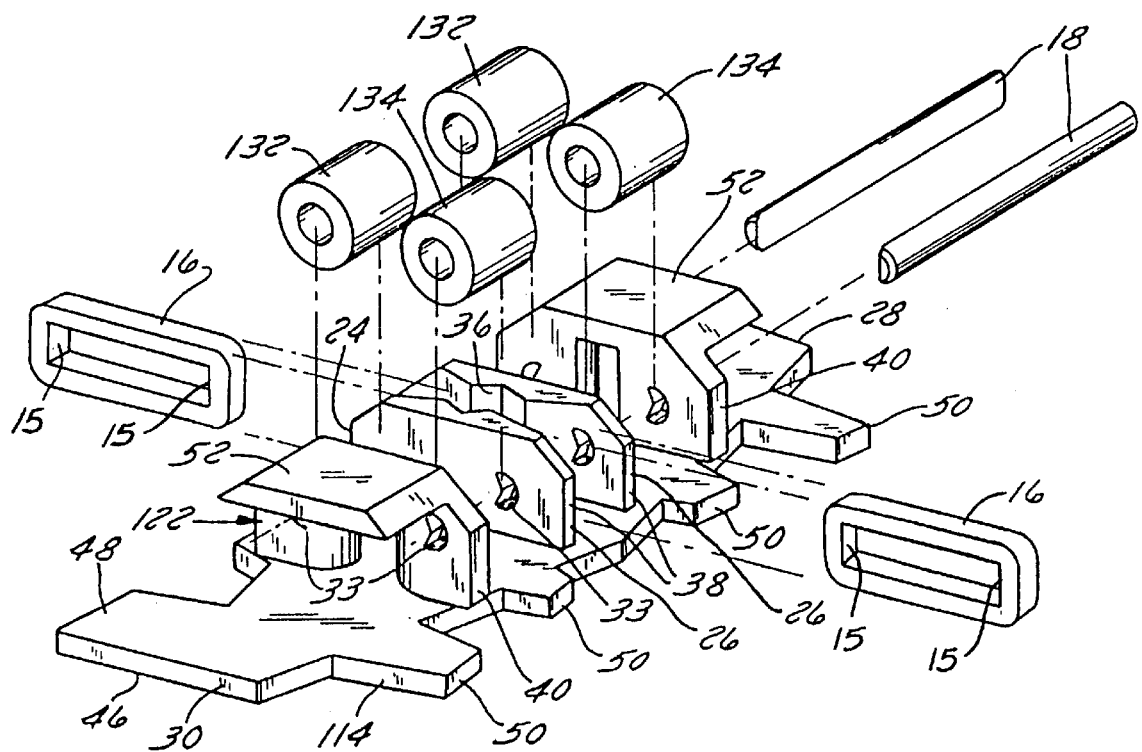
FIG. 9 is a bottom exploded perspective view of a second embodiment of the chain of the present invention.

FIG. 9 shows a modification of the chain shown in FIGS. 3–6. In this second embodiment of the chain, everything is the same as in the first embodiment, except the forward and rear knuckles 132, 134 are rollers, which are separate from the link body 122. In this embodiment, the knuckles 132, 134 have cylindrical holes, so they can rotate relative to the pins 18, and the non-cylindrical holes 33 of the carrier links 114, which limit rotation of the chain pins 18, are in the side plates 38, 40. As with the knuckles of the first embodiment, the knuckles 132, 134 are supported by the inner and outer plates 38, 40, which distribute the forces in the link body 122. These roller-type knuckles 132, 134 also provide surfaces against which the sprocket teeth drive in order to drive the chain. This type of chain may be supported by a frame which is somewhat different from the frames shown in FIGS. 7A–C. Instead of the top of the chain sliding on a wear strip 62, the frame (not shown) would provide rails on which the roller-type knuckles 132, 134 could roll, thereby reducing friction.

It will be obvious to those skilled in the art that modifications may be made to the embodiments described above without departing from the scope of the present invention.

What is claimed is:

1. A conveyor chain, comprising:
   a plurality of alternating carrier links and connector links;
   each of said carrier links comprising
      a link body, defining a forward portion, a rear portion, and left and right sides;
      a forward knuckle and a rear knuckle on said link body;
      said link body defining forward and rear holes for receiving chain pins;
   each of said connector links being received by the forward portion of one carrier link and by the rear portion of another carrier link; and
   a plurality of pins holding said respective carrier and connector links together to form said chain;
   wherein each of said carrier links in the assembled chain provides a forward drive surface and a rear drive surface for receiving sprocket teeth to drive the chain from below the chain; and
   wherein said chain pins have a non-circular cross-section; and said connector links define forward and rear internal surfaces which are shaped to receive the chain pins and to restrict relative motion between said chain pins and said connector links.

2. A conveyor chain as recited in claim 1, wherein said chain pins have a substantially D-shaped cross-section, including an arcuate lateral surface and a flat lateral surface.

3. A conveyor chain as recited in claim 2, wherein said connector links define flat forward and rear inside surfaces, which abut the flat lateral surfaces of the respective pins received in said connector links.

4. A conveyor chain as recited in claim 1, wherein the forward and rear holes in said carrier links are non-cylindrical and receive said non-cylindrical chain pins so as to limit rotation of said pins relative to said carrier links.

5. A conveyor chain, comprising:
   a plurality of alternating carrier links and connector links;
   each of said carrier links comprising
      a link body, defining a forward portion, a rear portion, and left and right sides;
      a forward knuckle and a rear knuckle on said link body;
      said link body defining forward and rear non-cylindrical holes for receiving chain pins;
   each of said connector links being received by the forward portion of one carrier link and by the rear portion of another carrier link; and
   a plurality of pins holding said respective carrier and connector links together to form said chain;
   wherein each of said carrier links in the assembled chain provides a forward drive surface and a rear drive surface for receiving sprocket teeth to drive the chain from below the chain; and
   wherein said chain pins have a non-circular cross-section; and said connector links define forward and rear internal surfaces which receive the chain pins and restrict relative motion between said chain pins and said connector links, and
   wherein each of said non-cylindrical holes in said carrier links includes a substantially arcuate side and a V-shaped side, defining two flat surfaces and a pivot line at the intersection of said two flat surfaces; and
   wherein said chain pins have a substantially D-shaped cross-section, including a flat side and an arcuate side, and wherein the flat side of each chain pin abuts one of the flat surfaces of one of the non-cylindrical holes and can pivot about said pivot line, so as to allow for restricted relative motion between said chain pins and said carrier links.

6. A chain as recited in claim 1, wherein said link body includes a pair of forward knuckles and a pair of rear knuckles, and each of said pairs of knuckles defines a slot for receiving its respective connector link;
   each of said connector links being received in the slot of the rear pair of knuckles of one carrier link and in the slot of the forward pair of knuckles of another carrier link.

7. A chain as recited in claim 1, wherein each of said knuckles is supported by inner and outer plates which are integral with the link body, so as to provide distribution of forces from the knuckles into the link body.

8. A chain as recited in claim 7, wherein said knuckles are integral with the link body.

9. A chain as recited in claim 7, wherein said knuckles are rollers, which are separate from the link body.

10. A chain as recited in claim 1, wherein said forward and rear knuckles further define a contoured surface for receiving a sprocket tooth from the side, so that said chain can also be driven from the side.

11. A chain as recited in claim 7, wherein said carrier links are made of plastic and said connector links and pins are made of metal so as to reduce the amount of stretch in the chain when the chain is in tension.

12. A conveyor chain, comprising:
   a plurality of alternating carrier links and connector links;
   each of said carrier links comprising
      a link body, defining a forward portion, a rear portion, and left and right sides;
      a forward knuckle and a rear knuckle on said link body;
      said link body defining forward and rear non-cylindrical holes for receiving chain pins;
   each of said connector links being received by the forward portion of one carrier link and by the rear portion of another carrier link; and
   a plurality of non-circular cross-section pins holding said respective carrier and connector links together to form said chain; each of said non-circular cross-section pins being received in one of said non-cylindrical holes of said link body with the pins and holes cooperating to permit restricted rotation of the pins in the holes;
   wherein each of said carrier links in the assembled chain provides a forward drive surface and a rear drive surface for receiving sprocket teeth to drive the chain from below the chain.

13. A conveyor chain as recited in claim 12, wherein said connector links define non-arcuate and non-cylindrical forward and rear interior surfaces, which mate with the non-cylindrical pins to limit rotation of the pins relative to the connector links.

14. A conveyor chain as recited in claim 13, wherein said pins have a substantially D-shaped cross-section, including a flat outer surface, and wherein said connector links have flat forward and rear inner surfaces which receive the respective flat outer surfaces of said pins.

15. A conveyor chain, comprising:
   a plurality of alternating carrier links and connector links;
   each of said carrier links comprising
      a link body, defining a forward portion, a rear portion, and left and right sides;
      a forward knuckle and a rear knuckle on said link body;
      said link body defining forward and rear non-cylindrical holes for receiving chain pins;
   each of said connector links being received by the forward portion of one carrier link and by the rear portion of another carrier link; and
   a plurality of D-shaped cross-section pins holding said respective carrier and connector links together to form said chain;
   wherein each of said carrier links in the assembled chain provides a forward drive surface and a rear drive surface for receiving sprocket teeth to drive the chain from below the chain; and
   wherein the holes of the carrier links include an arcuate portion and a V-shaped portion defining a pivot line, so that the pin received in each respective hole can rock about the pivot line.

* * * * *